(12) United States Patent
Grass et al.

(10) Patent No.: US 9,991,496 B2
(45) Date of Patent: Jun. 5, 2018

(54) TERMINAL HOLDER, BATTERY MODULE AND METHOD FOR PRODUCING SAME

(71) Applicant: Dr. Ing. h.c. F. Porsche Aktiengesellschaft, Stuttgart (DE)

(72) Inventors: Dominik Grass, Bietigheim-Bissingen (DE); Tim Schmidt, Ludwigsburg (DE); Thierry Mingers, Sospel (FR)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 346 days.

(21) Appl. No.: 14/751,250

(22) Filed: Jun. 26, 2015

(65) Prior Publication Data

US 2015/0380718 A1 Dec. 31, 2015

(30) Foreign Application Priority Data

Jun. 27, 2014 (DE) .................. 10 2014 109 054

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC ............................ H01M 2/206; H01M 2/1077
See application file for complete search history.

(56) References Cited

U.S. PATENT DOCUMENTS

| 8,642,203 B2 | 2/2014 | Joswig et al. |
| 2009/0214940 A1* | 8/2009 | Haussmann ........ H01M 2/1077 |
| | | 429/120 |
| 2012/0015227 A1 | 1/2012 | Hwang et al. |
| 2012/0258335 A1 | 10/2012 | Bae |

FOREIGN PATENT DOCUMENTS

| DE | 102008034878 | 1/2010 |
| DE | 102008059972 | 6/2010 |
| DE | 102009035487 | 2/2011 |
| DE | 102011009768 | 8/2012 |

OTHER PUBLICATIONS

German Search Report dated Mar. 11, 2015.

* cited by examiner

*Primary Examiner* — Oi K Conley
(74) *Attorney, Agent, or Firm* — Gerald E. Hespos; Michael J. Porco; Matthew J. Hespos

(57) ABSTRACT

A terminal holder is provided for holding a connection terminal (20) for at least three round cells (14, 15, 16). The terminal holder has a centrally encircling rib (11) for placement of the terminal holder (10) on the round cells (14, 15, 16) and for spacing the connection terminal (20) apart from the round cells (14, 15, 16). An elastic lip (12) is arranged at the end for clamping the terminal holder (10) between the round cells (14, 15, 16). A plastic head (13) is arranged opposite the lip (12), for fastening the terminal holder (10) on the connection terminal (20).

1 Claim, 4 Drawing Sheets

TERMINAL HOLDER, BATTERY MODULE AND METHOD FOR PRODUCING SAME

CROSS REFERENCE TO RELATED APPLICATION

This application claims priority under 35 USC 119 to German Patent Appl. No. 10 2014 109 054.3 filed on Jun. 27, 2014, the entire disclosure of which is incorporated herein by reference.

BACKGROUND

1. Field of the Invention

The invention relates to a terminal holder, a battery module equipped with a terminal holder and to a method for producing a battery module of this kind.

2. Description of the Related Art

The term "electric vehicle" commonly includes any means of transport that is driven by electric energy. The above designation thus includes road vehicles, especially motor vehicles, rail vehicles, watercraft and aircraft. A "hybrid vehicle" has the electric drive combined with another drive. Energy required for driving that cannot be supplied continuously from outside is stored in the vehicle itself by suitable "traction batteries". According to the prior art, such traction batteries are typically of modular construction, where each battery module can comprise secondary cells, generally of round construction. U.S. Pat. No. 8,642,203 B2, DE 10 2008 034 878 B4 and DE 10 2008 059 972 A1 disclose round cell accumulators of this type.

Another known practice is to connect respective poles of a number of battery cells to one another by means of a conductive board or a metal sheet. This component can serve as a connection terminal to contact all the battery cells of a battery module over an extended area. DE 10 2009 035 487 A1 describes an arrangement of this kind. However, the mechanical holding of the terminal proves problematic. In this respect, DE 10 2011 009 768 A1 proposes to weld or solder corresponding rail- or plate-shaped elements to the cells. Nevertheless, this gives rise to tolerances that have to be compensated for by additional measures according to the prior art.

In view of the above, an object of the invention is to fix a connection terminal reliably on an assembly of battery cells. A further object is provide a battery module and a method for producing a battery module of this type.

SUMMARY OF THE INVENTION

The invention relates to a battery module with round cells and a terminal holder that employs a combination of non-positive and positive connection techniques. At the same time, the proposed device supports a particularly uncomplicated manufacturing method, in which a terminal holder is inserted between three round cells and centers itself in a largely automatic way through the elasticity of its lip. These functional and procedural advantages allow a considerable lowering of unit costs as compared with conventional battery modules.

The development enables an introduction of a terminal holder between the round cells at any conceivable center angle by exploiting the rotational symmetry of the main body.

The terminal holder may be of integral construction thereby further reducing the complexity of the production process.

An insulator may be disposed between the round cells and the connection terminal. The insulator may be a polymer, such as a polyamide and may be fiber reinforced for additional strength, rigidity and toughness, while ensuring resistance to chemicals.

The round cells may be encapsulated with a potting compound after the terminal holder has been clamped to achieve high stability and sealing with a low weight.

An illustrative embodiment of the invention is shown in the drawings and is described in detail below.

DETAILED DESCRIPTION OF THE PREFERRED EMBODIMENTS

Figure 1:
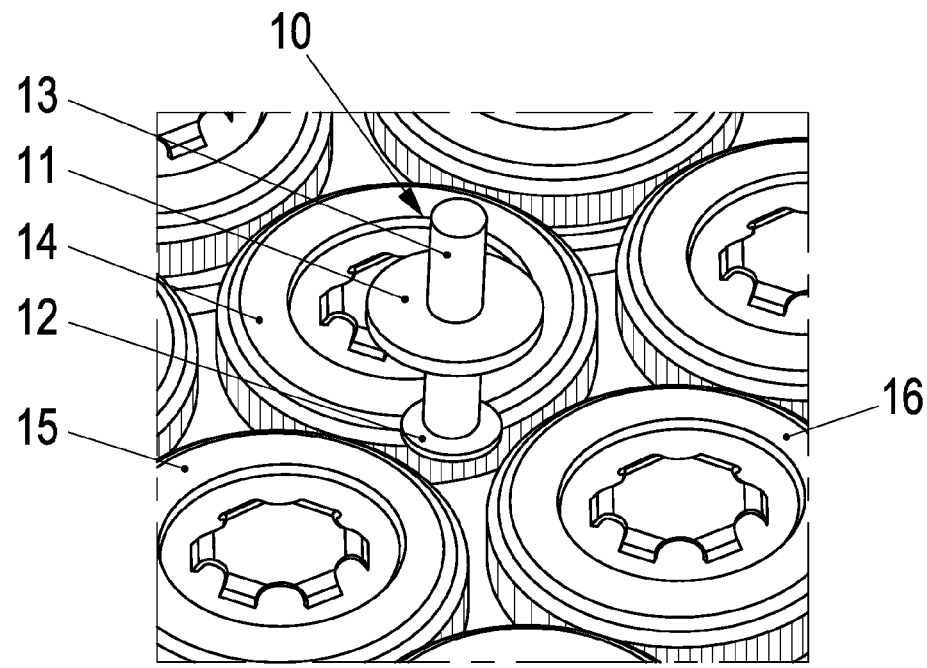
FIG. 1 is a perspective view of a terminal holder according to the invention.

A terminal holder according to the invention is identified by the numeral 10 in FIG. 1. The terminal holder 10 is of unitary or integral construction and has a substantially cylindrical main body with a centrally encircling rib 11 and an elastic lip 12 molded at one end. A head 13 is defined at the end of the main body opposite from the lip 12.

The terminal holder 10 may be formed from a polyamide with DIN abbreviation PA 66 GF 30 and with a glass fiber content of 30%. However, an alternative embodiment may use of an unreinforced polyamide or some other nonconductive polymer that has the ductility and suitability for molding required for the respective use.

Figure 2:
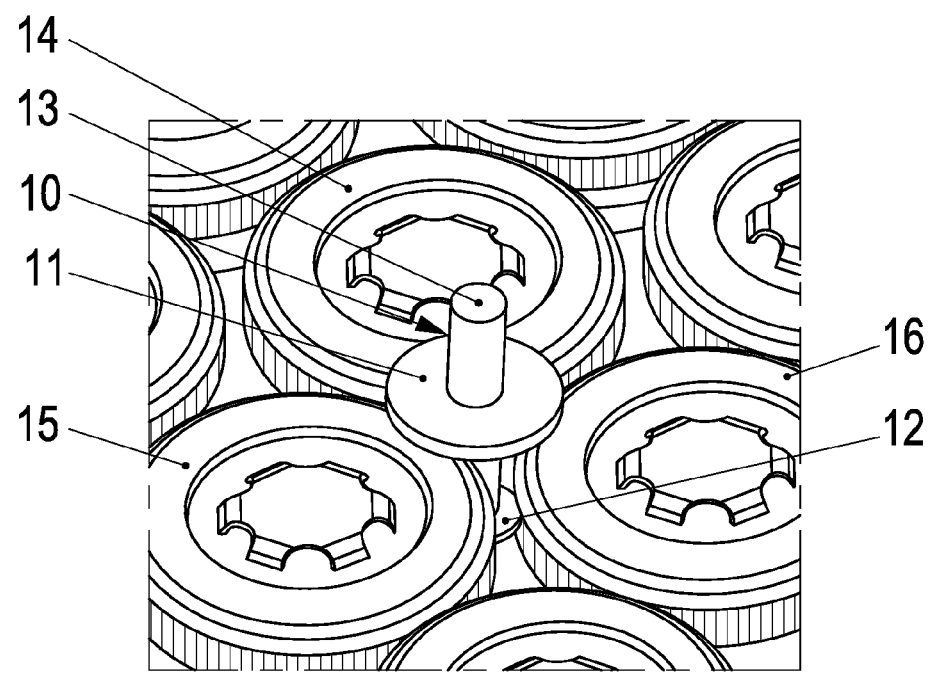
FIG. 2 illustrates a production method of the invention in a first phase.

FIGS. 2 to 5 illustrate the use of the terminal holder 10 in the context of a method according to the invention for producing a battery module for a hybrid or electric vehicle. As shown in FIG. 2, the battery module for storing electric energy comprises an assembly of many round or cylindrical cells in a hexagonally ultracompact cylinder package. The proposed method will be explained purely by way of example below by means of three round or cylindrical cells 14, 15, 16 in a triangular arrangement, wherein the steps now described could be applied to all such arrangements within the battery module.

Figure 3:
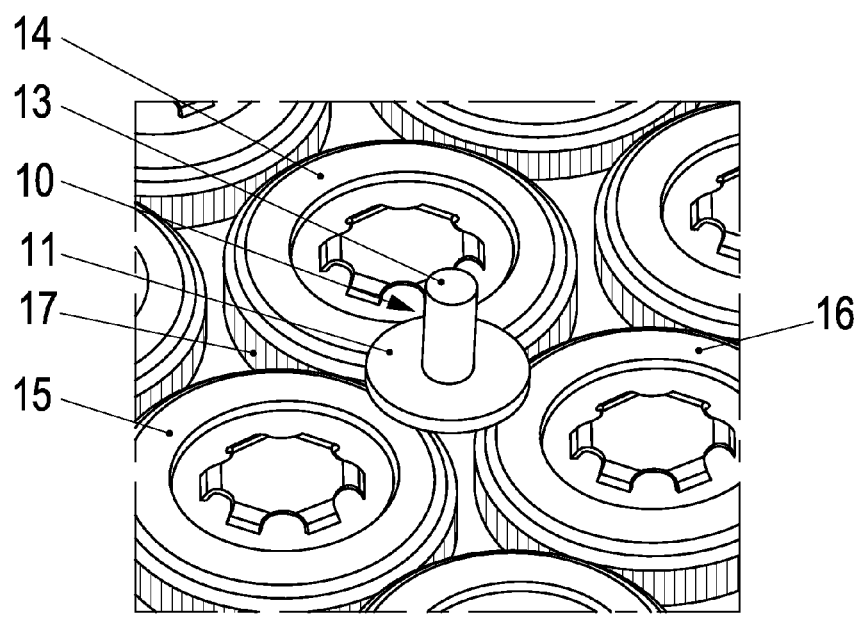
FIG. 3 illustrates the production method in a second phase.

As FIG. 2 shows, the terminal holder 10 initially is aligned approximately axially parallel to the round cells 14, 15, 16 and is positioned approximately vertically over the centroid of the triangle formed by the poles thereof so that the lip 12 faces in the direction of the round cells 14, 15, 16 and the head 13 faces away therefrom. From this approximate initial position, any deviations are compensated for by the features of the terminal holder 10, as explained herein. The terminal holder 10 can be introduced largely vertically into the interstices between the round cells 14, 15, 16, and parallel to the longitudinal axes thereof. The movement in this direction is effectively limited by the rib 11 as soon as the rib is resting on the end faces of the round cells 14, 15, 16, so that only the head 13 is still projecting from the assembly. This vertical end position of the terminal holder 10 is shown in FIG. 3.

The pairwise contact between the round cells 14, 15, 16 requires that the circumferential surfaces thereof should pose a mechanical resistance to the penetration of the terminal holder 10, said resistance being dependent on the diameter of the lip 12 of the terminal holder 10. In this phase, the elasticity of the lip 12 is decisive and enables the lip 12 to adapt to the cavity remaining between the round cells 14, 15, 16. At the same time, the resiliently deformed lip 12 exerts a uniform restoring force with three equiangular direction components on the terminal holder 10 to achieve a clamped elastically between the round cells 14, 15, 16.

Figure 4:
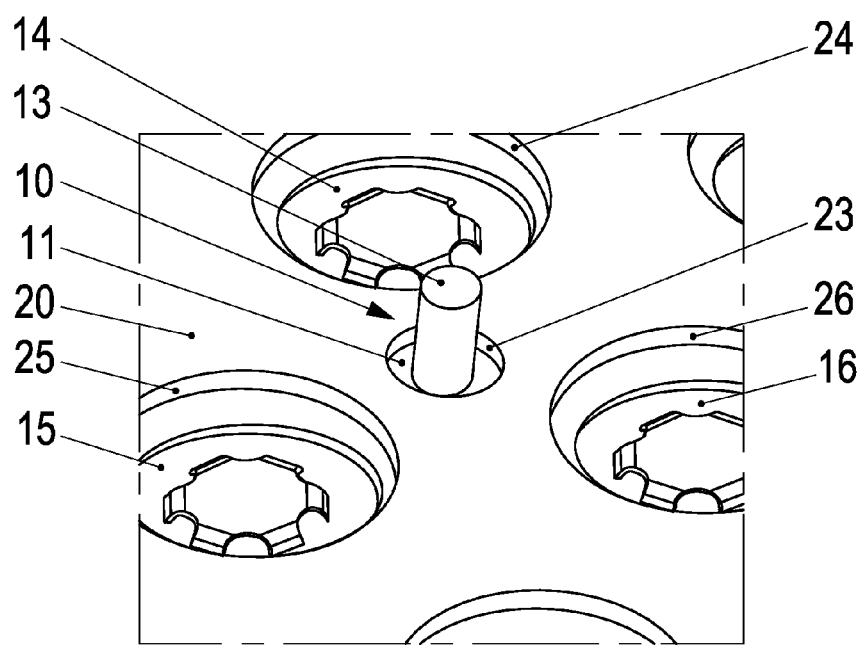
FIG. 4 illustrates the production method in a third phase.
Figure 5:
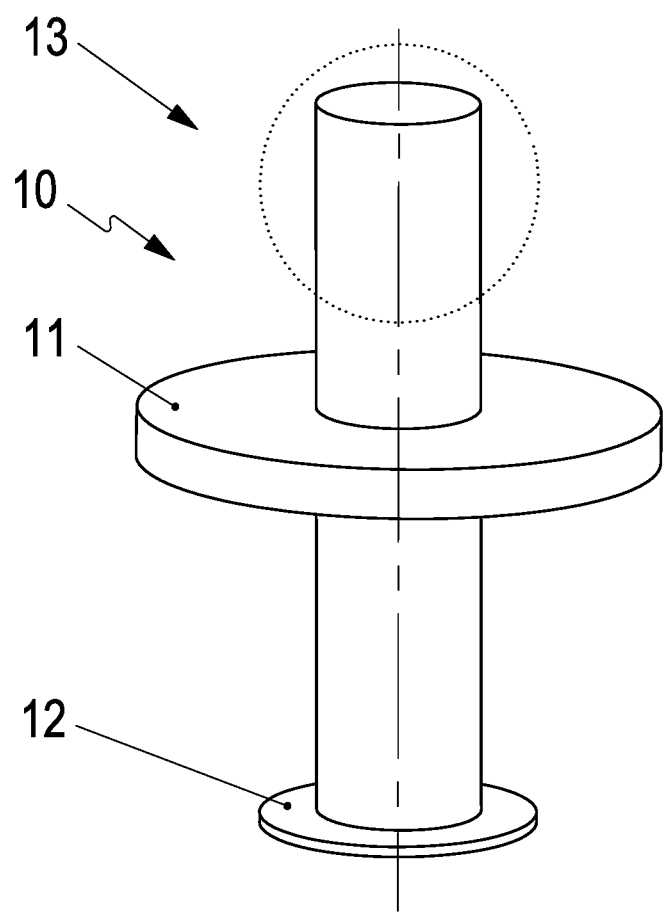
FIG. 5 illustrates the production method in a fourth phase.

As shown in FIG. 4, the round cells 14, 15, 16, together with the lower region of the terminal holder 10 clamped in this way, then are encapsulated with a potting compound 17. A connection terminal 20 with three equidistant apertures 24, 25, 26 can then be placed on the end faces of the round cells 14, 15, 16 so that a central, fourth hole 23 accommodates the head 13 of the terminal holder 10 that projects from the assembly, placement preferably taking place only after the curing of said potting compound 17. Of course, the connection terminal 20 may have considerably more apertures to match a corresponding multiplicity of round cells 14, 15, 16 and terminal holders 10. In this case, the heads 13 interact with the corresponding apertures 23 to function simultaneously as a positioning aid for the terminal holder 10 and the connection terminal 20. The apertures 24, 25, 26 need not be of hollow-cylindrical design and aligned coaxially with the round cells 14, 15, 16. FIG. 5 reflects the temporary final state of this method step, as a consequence of which only the head 13 of the terminal holder 10 projects from the hole 13 in the connection terminal 20.

Figure 6:
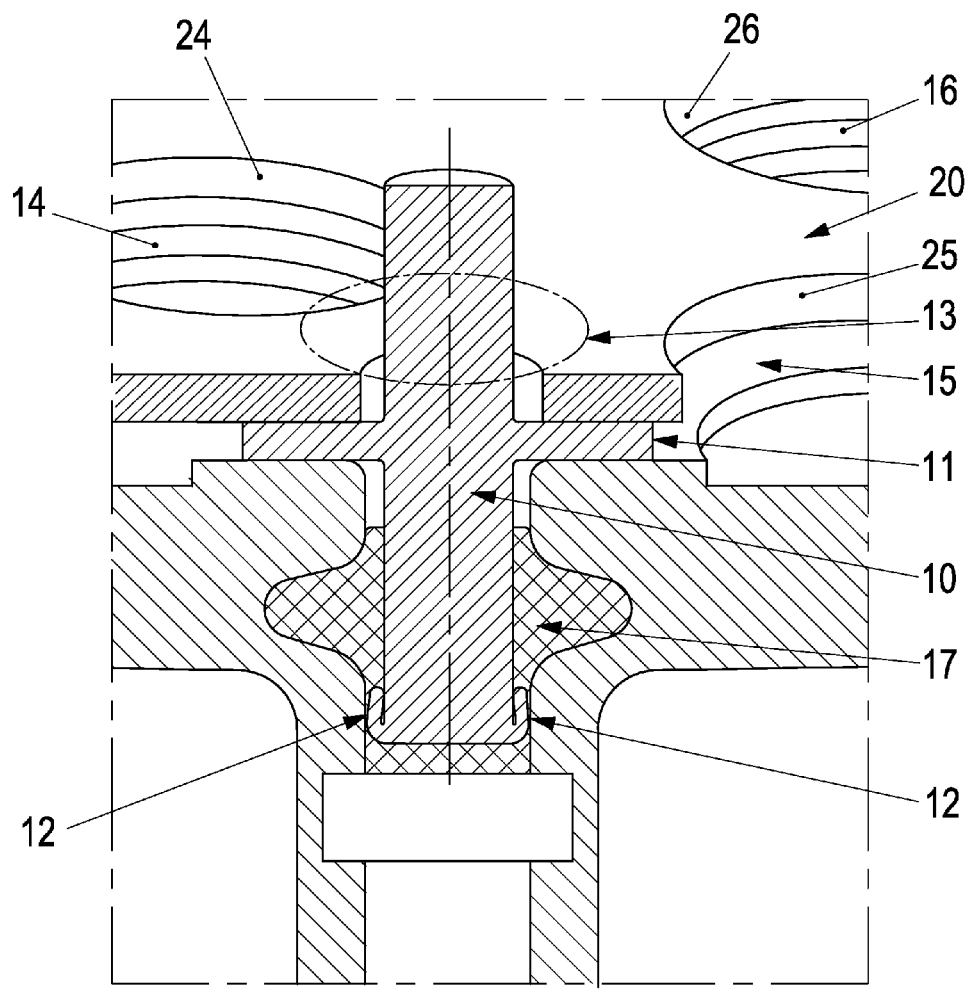
FIG. 6 is a perspective section through a battery module of the invention.

In a final method step, preferably under the action of heat, the head 13 of the terminal holder 10 is plastically deformed and, as FIG. 6 illustrates in conjunction with FIG. 5, is pressed flat onto the connection terminal 20 over the edges of the hole 13. The head 13, which is now also connected positively to the connection terminal 20 perpendicularly to the axis of the terminal holder 10, thus fastens the connection terminal 20 finally on the terminal holder 10, where it can serve for contacting the round cells 14, 15, 16 during the operation of the battery module.

What is claimed is:

1. A battery module for a hybrid or electric vehicle, comprising:
    at least three round cells for storing electric energy, each of the at least three round cells extending in an axial direction and arranged substantially parallel to each other;
    at least one terminal holder arranged axially parallel to the at least three round cells, the at least one terminal holder having opposite first and second ends spaced apart in the axial direction, an annular elastic lip extending radially outward from the first end and the second end defining a plastic head, an annular rib extending radially from the at least one terminal holder at a position between the first and second ends to contact end faces of the at least three round cells; and
    a connection terminal held mechanically on the end faces of the at least three round cells by the at least one terminal holder for electrically contacting the at least three round cells, the connection terminal having at least three equidistant apertures aligned with the end faces of the at least three round cells and a fourth aperture aligned with the head of the at least one terminal holder, and the connection terminal being spaced from portions of the at least three round cells by the rib.

* * * * *